US007558389B2

(12) United States Patent
DeSimone

(10) Patent No.: US 7,558,389 B2
(45) Date of Patent: Jul. 7, 2009

(54) METHOD AND SYSTEM OF GENERATING A SPEECH SIGNAL WITH OVERLAYED RANDOM FREQUENCY SIGNAL

(75) Inventor: Joseph DeSimone, Freehold, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 703 days.

(21) Appl. No.: 10/957,222

(22) Filed: Oct. 1, 2004

(65) Prior Publication Data

US 2006/0074677 A1 Apr. 6, 2006

(51) Int. Cl.
*H04L 9/00* (2006.01)
*H04N 7/167* (2006.01)
*G10L 19/00* (2006.01)

(52) U.S. Cl. .................... 380/275; 704/200.1; 704/273; 704/205; 380/238; 380/268

(58) Field of Classification Search ................ 704/268, 704/261, 273, 258, 270; 380/238, 38, 210, 380/268, 275
See application file for complete search history.

(56) References Cited

U.S. PATENT DOCUMENTS

| | | | | |
|---|---|---|---|---|
| 2,292,387 | A * | 8/1942 | Markey et al. | 380/34 |
| 5,970,453 | A | 10/1999 | Sharman | |
| 6,535,852 | B2 | 3/2003 | Eide | |
| 2004/0019484 | A1 | 1/2004 | Kobayashi et al. | |
| 2004/0148172 | A1 * | 7/2004 | Cohen et al. | 704/268 |
| 2004/0254793 | A1 * | 12/2004 | Herley et al. | 704/270 |

OTHER PUBLICATIONS

European Search Report (PCT) issued by the European Patent Office on Dec. 15, 2005 from related Application No. EP 05 27 0061.

Kemble, Kimberlee A., "An Introduction to Speech Recognition", VoiceXML Website, 2001.

AT&T Corp., "TTS: Synthesis of Audible Speech from Text", AT&T Website, 2003.

AT&T Corp., "AT&T Watson Speech Recognition", AT&T Website, May 1996.

Tsz-Yan Chan Ed—Institute of Electrical and Electronics Engineers: "Using a text-to-speech synthesizer to generate a reverse turing test"; Proceedings 15th IEEE International Conference on Tools with Artificial Intelligence. ICTAI 2003. Sacramento, CA, Nov. 3-5, 2003, IEEE International Conference on Tools with Artificial Intelligence, Los Alamitos, CA, IEEE Comp. Soc, US, vol. Conf. 15, Nov. 3, 2003, pp. 226-232, XP010672232; ISBN: 07695-2038-3; *abstract*, *p. 226, right-hand column, last paragraph—p. 227, left-hand column, paragraph 3*, *p. 230, left-hand column, paragraph 1-3*.

(Continued)

*Primary Examiner*—Patrick N Edouard
*Assistant Examiner*—Eric Yen
(74) *Attorney, Agent, or Firm*—Hoffmann & Baron, LLP

(57) ABSTRACT

A method and apparatus utilizing prosody modification of a speech signal output by a text-to-speech (TTS) system to substantially prevent an interactive voice response (IVR) system from understanding the speech signal without significantly degrading the speech signal with respect to human understanding. The present invention involves modifying the prosody of the speech output signal by using the prosody of the user's response to a prompt. In addition, a randomly generated overlay frequency is used to modify the speech signal to further prevent an IVR system from recognizing the TTS output. The randomly generated frequency may be periodically changed using an overlay timer that changes the random frequency signal at a predetermined intervals.

14 Claims, 10 Drawing Sheets

OTHER PUBLICATIONS

Wentao Gu et al: "An Efficient Speaker Adaptation Method for TTS Duration Model" 1998 International Conference on Spoken Language Processing, Nov. 30-Dec. 4, 1998, vol. 4, Nov. 30, 1998, pp. 1839-1842, XP007001359 Sydney (Australia), *abstract*, *p. 1839, left-hand column, paragraph 1—right-hand column, paragraph 1*, *p. 1840, left-hand column, paragraph 1*.

Greg Kochanski et al: "A Reverse Turing Test Using Speech"; ICSLP 2002: 7th International Conference on Spoken Language Processing, Denver, Colorado, Sep. 16-20, 2002, International Conference on Spoken Language Processing. (ICSLP), Adelaide: Causal Productions, AU, vol. vol. 4 of 4, Sep. 16, 2002, p. 1357, XP007011540; ISBN: 1-876346-40-X, *abstract*.

* cited by examiner

METHOD AND SYSTEM OF GENERATING A SPEECH SIGNAL WITH OVERLAYED RANDOM FREQUENCY SIGNAL

TECHNICAL FIELD

The present invention relates generally to text-to-speech (TTS) synthesis systems, and more particularly to a method and apparatus for generating and modifying the output of a TTS system to prevent interactive voice response (IVR) systems from comprehending speech output from the TTS system while enabling the speech output to be comprehensible by TTS users.

BACKGROUND OF THE INVENTION

Text-to-speech (TTS) synthesis technology gives machines the ability to convert machine-readable text into audible speech. TTS technology is useful when a computer application needs to communicate with a person. Although recorded voice prompts often meet this need, this approach provides limited flexibility and can be very costly in high-volume applications. Thus, TTS is particularly helpful in telephone services, providing general business (stock quotes) and sports information, and reading e-mail or Web pages from the Internet over a telephone.

Speech synthesis is technically demanding since TTS systems must model generic and phonetic features that make speech intelligible, as well as idiosyncratic and acoustic features that make it sound human. Although written text includes phonetic information, vocal qualities that represent emotional states, moods, and variations in emphasis or attitude are largely unrepresented. For instance, the elements of prosody, which include register, accentuation, intonation, and speed of delivery, are rarely represented in written text. However, without these features, synthesized speech sounds unnatural and monotonous.

Generating speech from written text essentially involves textual and linguistic analysis and synthesis. The first task converts the text into a linguistic representation, which includes phonemes and their duration, the location of phrase boundaries, as well as pitch and frequency contours for each phrase. Synthesis generates an acoustic waveform or speech signal from the information provided by linguistic analysis.

A block diagram of a conventional customer-care system 10 involving both speech recognition and generation within a telecommunication application is shown in FIG. 1. A user 12 typically inputs a voice signal 22 to the automated customer-care system 10. The voice signal 22 is analyzed by an automatic speech recognition (ASR) subsystem 14. The ASR subsystem 14 decodes the words spoken and feeds these into a spoken language understanding (SLU) subsystem 16.

The task of the SLU subsystem 16 is to extract the meaning of the words. For instance, the words "I need the telephone number for John Adams" imply that the user 12 wants operator assistance. A dialog management subsystem 18 then preferably determines the next action that the customer-care system 10 should take, such as determining the city and state of the person to be called, and instructs a TTS subsystem 20 to synthesize the question "What city and state please?" This question is then output from the TTS subsystem 20 as a speech signal 24 to the user 12.

There are several different methods to synthesize speech, but each method can be categorized as either articulatory synthesis, formant synthesis, or concatenative synthesis. Articulatory synthesis uses computational biomechanical models of speech production, such as models of a glottis, which generate periodic and aspiration excitation, and a moving vocal tract. Articulatory synthesizers are typically controlled by simulated muscle actions of the articulators, such as the tongue, lips, and glottis. The articulatory synthesizer also solves time-dependent three-dimensional differential equations to compute the synthetic speech output. However, in addition to high computational requirements, articulatory synthesis does not result in natural-sounding fluent speech.

Formant synthesis uses a set of rules for controlling a highly simplified source-filter model that assumes that the source or glottis is independent from the filter or vocal tract. The filter is determined by control parameters, such as formant frequencies and bandwidths. Formants are associated with a particular resonance, which is characterized as a peak in a filter characteristic of the vocal tract. The source generates either stylized glottal or other pulses for periodic sounds, or noise for aspiration. Formant synthesis generates intelligible, but not completely natural-sounding speech, and has the advantages of low memory and moderate computational requirements.

Concatenative synthesis uses portions of recorded speech that are cut from recordings and stored in an inventory or voice database, either as uncoded waveforms, or encoded by a suitable speech coding method. Elementary units or speech segments are, for example, phones, which are vowels or consonants, or diphones, which are phone-to-phone transitions that encompass a second half of one phone and a first half of the next phone. Diphones can also be thought of as vowel-to-consonant transitions.

Concatenative synthesizers often use demi-syllables, which are half-syllables or syllable-to-syllable transitions, and apply the diphone method to the time scale of syllables. The corresponding synthesis process then joins units selected from the voice database, and, after optional decoding, outputs the resulting speech signal. Since concatenative systems use portions of pre-recorded speech, this method is most likely to sound natural.

Each of the portions of original speech has an associated prosody contour, which includes pitch and duration uttered by the speaker. However, when small portions of natural speech arising from different utterances in the database are concatenated, the resulting synthetic speech may still differ substantially from natural-sounding prosody, which is instrumental in the perception of intonation and stress in a word.

Despite the existence of these differences, the speech signal 24 output from the conventional TTS subsystem 20 shown in FIG. 4 is readily recognizable by speech recognition systems. Although this may at first appear to be an advantage, it actually results in a significant drawback that may lead to security breaches, misappropriation of information, and loss of data integrity.

For instance, assume that the customer-care system 10 shown in FIG. 1 is an automated banking system 11 as shown in FIG. 2, and that the user 12 has been replaced by an automated interactive voice response (IVR) system 13, which utilizes speech recognition to interface with the TTS subsystem 20 and synthesized speech generation to interface with the speech recognition subsystem 14. Speaker-dependent recognition systems require a training period to adjust to variations between individual speakers. However, all speech signals 24 output from the TTS subsystem 20 are typically in the same voice, and thus appear to the IVR system 13 to be uttered from the same person, which further facilitates its recognition process.

By integrating the IVR system 13 with an algorithm to collect and/or modify information obtained from the automated banking system 11, potential security breaches, credit fraud, misappropriation of funds, unauthorized modification of information, and the like could easily be implemented on a grand scale. In view of the foregoing considerations, a method and system are called for to address the growing demand for securing access to information available from TTS systems.

SUMMARY OF THE INVENTION

It is an object of the present invention to provide a method and apparatus for generating a speech signal that has at least one prosody characteristic modified based on a prosody sample.

It is an object of the present invention to provide a method and apparatus that substantially prevents comprehension by an interactive voice response (IVR) system of a speech signal output by a text-to-speech (TTS) system.

It is another object of the present invention to provide a method and apparatus that significantly reduce security breaches, misappropriation of information, and modification of information available from TTS systems caused by IVR systems.

It is yet another object of the present invention to provide a method and apparatus that substantially prevent recognition by an IVR system of a speech signal output by a TTS system, while not significantly degrading the speech signal with respect to human understanding.

In accordance with one form of the present invention, incorporating some of the preferred features, a method of preventing the comprehension and/or recognition of a speech signal by a speech recognition system includes the step of generating a speech signal by a TTS subsystem. The text-to-speech synthesizer can be a program that is readily available on the market. The speech signal includes at least one prosody characteristic. The method also includes modifying the at least one prosody characteristic of the speech signal and outputting a modified speech signal. The modified speech signal includes the at least one modified prosody characteristic.

In accordance with another form of the present invention, incorporating some of the preferred features, a system for preventing the recognition of a speech signal by a speech recognition system includes a TTS subsystem and a prosody modifier. The TTS subsystem inputs a text file and generates a speech signal representing the text file. The text speech synthesizer or TSS subsystem can be a system that is known to those skilled in the art. The speech signal includes at least one prosody characteristic. The prosody modifier inputs the speech signal and modifies the at least one prosody characteristic associated with the speech signal. The prosody modifier generates a modified speech signal that includes the at least one modified prosody characteristic.

In a preferred embodiment, the system can also include a frequency overlay subsystem that is used to generate a random frequency signal that is overlayed onto the modified speech signal. The frequency overlay subsystem can also include a timer that is set to expire at a predetermined time. The timer is used so that after it has expired the frequency overlay subsystem will recalculate a new frequency to further prevent an IVR system from recognizing these signals.

In a preferred embodiment of the present invention, a prosody sample is obtained and is then used to modify the at least one prosody characteristic of the speech signal. The speech signal is modified by the prosody sample to output a modified speech signal that can change with each user, thereby preventing the IVR system from understanding the speech signal.

The prosody sample can be obtained by prompting a user for information such as a person's name or other identifying information. After the information is received from the user, a prosody sample is obtained from the response. The prosody sample is then used to modify the speech signal created by the text speech synthesizer to create a prosody modified speech signal.

In an alternative embodiment, to further prevent the recognition of the speech signal by an IVR system, a random frequency signal is preferably overlayed on the prosody modified speech signal to create a modified speech signal. The random frequency signal is preferably in the audible human hearing range between 20 Hz and 8,000 Hz and between 16,000 Hz to 20,000 Hz. After the random frequency signal is calculated, it is compared to the acceptable frequency range, which is within the audible human hearing range. If the random frequency signal is within the acceptable range, it is then overlayed or mixed with the speech signal. However, if the random frequency signal is not within the acceptable frequency range, the random frequency signal is recalculated and then compared to the acceptable frequency range again. This process is continued until an acceptable frequency is found.

In a preferred embodiment, the random frequency signal is preferably calculated using various random parameters. A first random number is preferably calculated. A variable parameter such as wind speed or air temperature is then measured. The variable parameter is then used as a second random number. The first random number is divided by the second random number to generate a quotient. The quotient is then preferably normalized to be within the values of the audible hearing range. If the quotient is within the acceptable frequency range, the random frequency signal is used as stated earlier. If, however, the quotient is not within the acceptable frequency range, the steps of obtaining a first random number and second random number can be repeated until an acceptable frequency range is obtained. An advantage to this particular type of generation of a random frequency signal is that it is dependent on a variable parameter such as wind or air speed which is not determinant.

In a further embodiment of the present invention, the random frequency signal preferably includes an overlay timer to decrease the possibility of an IVR system recognizing the speech output. The overlay timer is used so that a new random frequency signal can be changed at set intervals to prevent an IVR system from recognizing the speech signal. The overlay timer is first initialized prior to the speech signal being output. The overlay timer is set to expire at a predetermined time that can be set by the user. The system then determines if the overlay timer has expired. If the overlay timer has not expired, a modified speech signal is output with the frequency overlay subsystem output. If, however, the overlay timer has expired, the random frequency signal is recalculated and the overlay timer is reinitialized so that a new random frequency signal is output with the modified speech signal. An advantage of using the overlay timer is that the random frequency signal will change making it difficult for an IVR system to recognize any particular frequency.

Other objects and features of the present invention will become apparent from the following detailed description considered in conjunction with the accompanying drawings.

It is to be understood, however, that the drawings are designed as an illustration only and not as a definition of the limits of the invention.

DETAILED DESCRIPTION

One difficulty with concatenative synthesis is the decision of exactly what type of segment to select. Long phrases reproduce the actual utterance originally spoken and are widely used in interactive voice-response (IVR) systems. Such segments are very difficult to modify or extend for even trivial changes in the text. Phoneme-sized segments can be extracted from aligned phonetic-acoustic data sequences, but simple phonemes alone cannot typically model difficult transition periods between steady-state central sections, which can also lead to unnatural sounding speech. Diphone and demi-syllable segments have been popular in TTS systems since these segments include transition regions, and can conveniently yield locally intelligible acoustic waveforms.

Another problem with concatenating phonemes or larger units is the need to modify each segment according to prosodic requirements and the intended context. A linear predictive coding (LPC) representation of the audio signal enables the pitch to be readily modified. A so-called pitch-synchronous-overlap-and-add (PSOLA) technique enables both pitch and duration to be modified for each segment of a complete output waveform. These approaches introduce degradation of the output waveform by introducing perceptual effects related to the excitation chosen, in the LPC case, or unwanted noise due to accidental discontinuities between segments, in the PSOLA case.

In most concatenative synthesis systems, the determination of the actual segments is also a significant problem. If the segments are determined by hand, the process is slow and tedious. If the segments are determined automatically, the segments may contain errors that will degrade voice quality. While automatic segmentation can be done without operator intervention by using a speech recognition engine in a phoneme-recognizing mode, the quality of segmentation at the phonetic level may not be adequate to isolate units. In this case, manual tuning would still be required.

Figure 1:
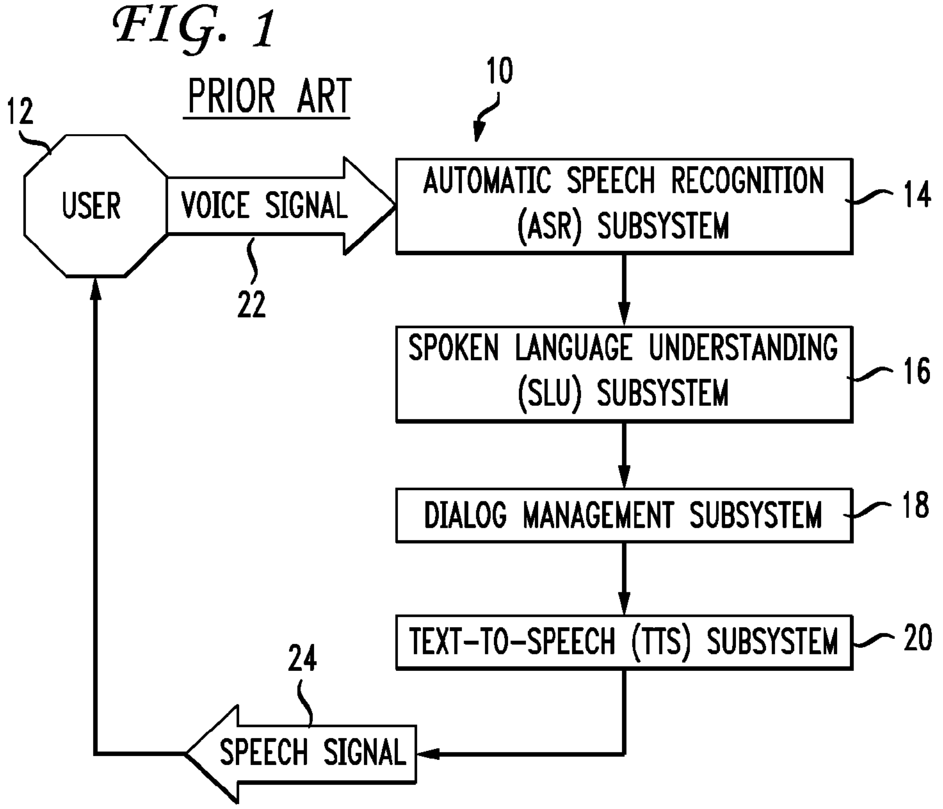
FIG. 1 PRIOR ART
FIG. 1 is a block diagram of a conventional customer-care system incorporating both speech recognition and generation within a telecommunication application.
Figure 2:
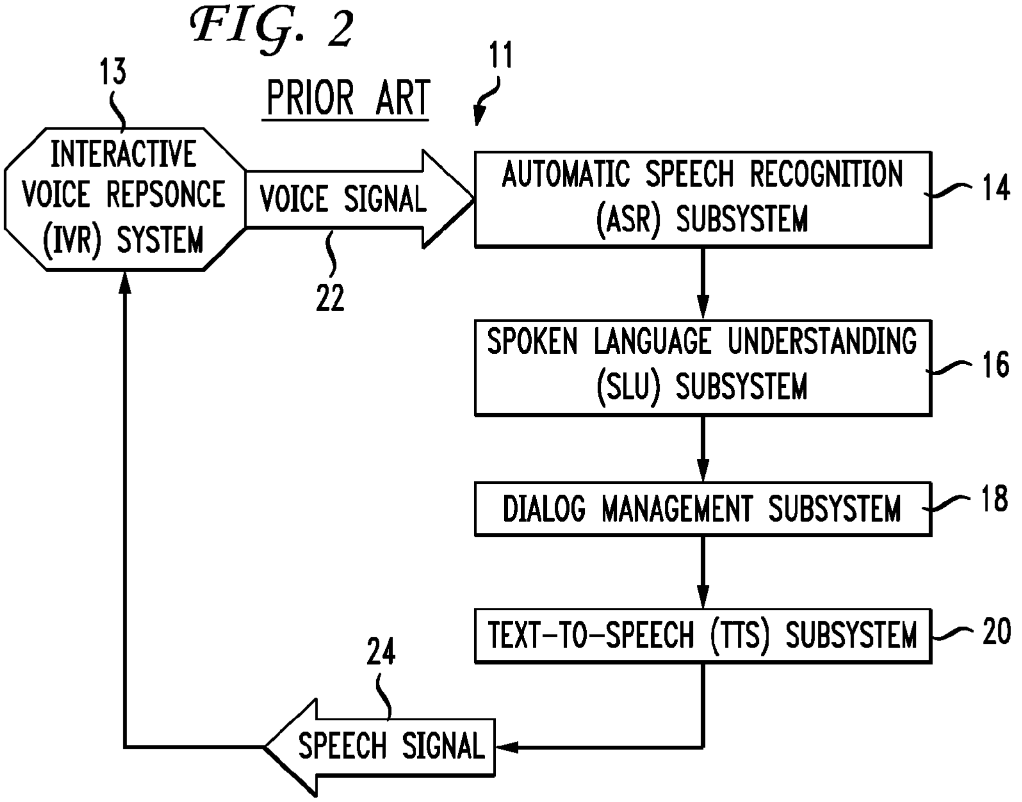
FIG. 2 PRIOR ART
FIG. 2 is a block diagram of a conventional automated banking system incorporating both speech recognition and generation.
Figure 3:
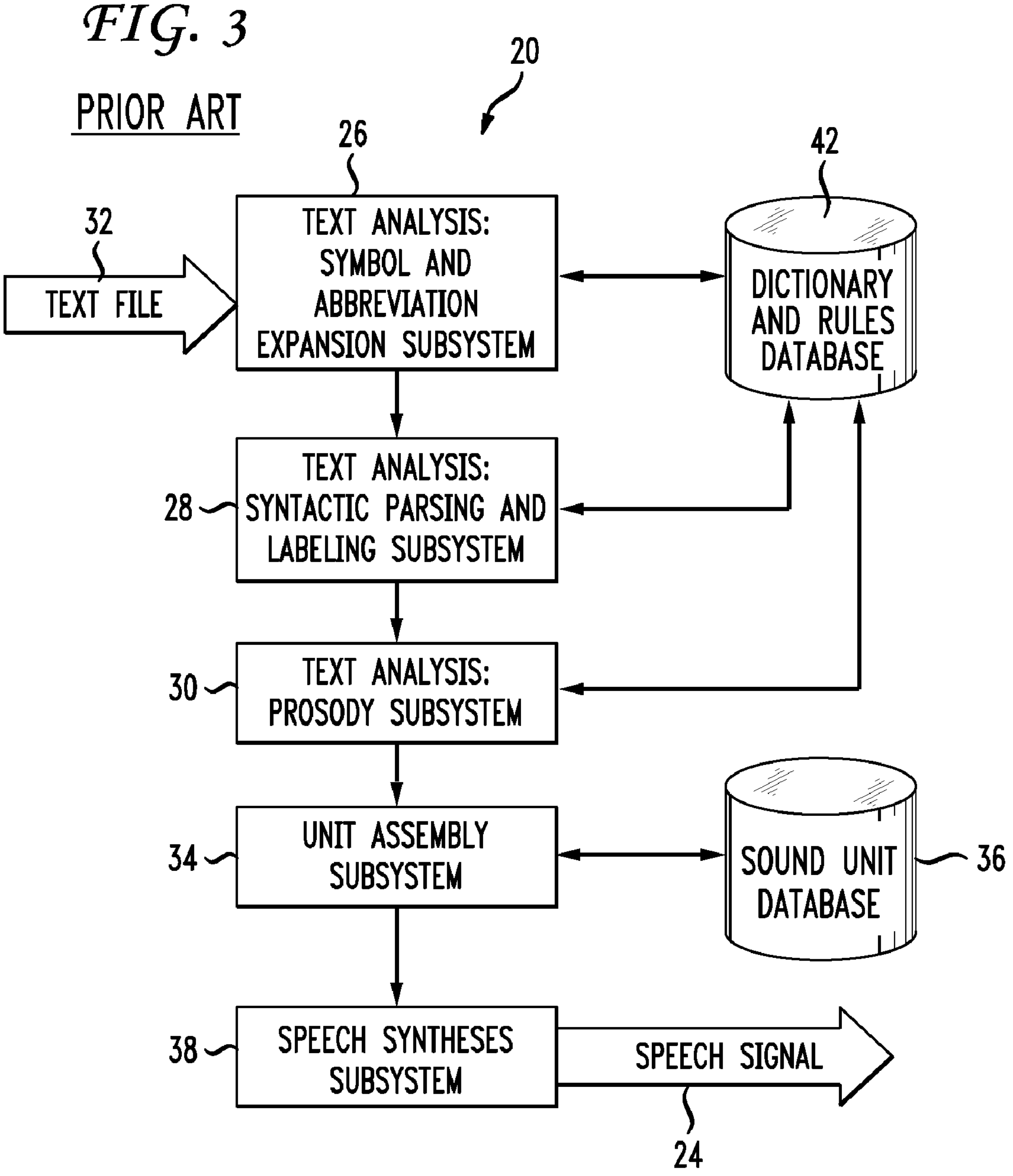
FIG. 3 PRIOR ART
FIG. 3 is a block diagram of a conventional text-to-speech (TTS) subsystem.

A block diagram of a TTS subsystem 20 using concatenative synthesis is shown in FIG. 3. The TTS subsystem 20 preferably provides text analysis functions that input an ASCII message text file 32 and convert it to a series of phonetic symbols and prosody (fundamental frequency, duration, and amplitude) targets. The text analysis portion of the TTS subsystem 20 preferably includes three separate subsystems 26, 28, 30 with functions that are in many ways dependent on each other. A symbol and abbreviation expansion subsystem 26 preferably inputs the text file 32 and analyzes non-alphabetic symbols and abbreviations for expansion into full words. For example, in the sentence "Dr. Smith lives at 4305 Elm Dr.", the first "Dr." is transcribed as "Doctor", while the second one is transcribed as "Drive". The symbol and abbreviation subsystem 26 then expands "4305" to "forty three oh five".

A syntactic parsing and labeling subsystem 28 then preferably recognizes the part of speech associated with each word in the sentence and uses this information to label the text. Syntactic labeling removes ambiguities in constituent portions of the sentence to generate the correct string of phones, with the help of a pronunciation dictionary database 42. Thus, for the sentence discussed above, the verb "lives" is disambiguated from the noun "lives", which is the plural of "life". If the dictionary search fails to retrieve an adequate result, a letter-to-sound rules database 42 is preferably used.

A prosody subsystem 30 then preferably predicts sentence phrasing and word accents using punctuated text, syntactic information, and phonological information from the syntactic parsing and labeling subsystem 28. From this information, targets that are directed to, for example, fundamental frequency, phoneme duration, and amplitude, are generated by the prosody subsystem 30.

A unit assembly subsystem 34 shown in FIG. 3 preferably utilizes a sound unit database 36 to assemble the units according to the list of targets generated by the prosody subsystem 30. The unit assembly subsystem 34 can be very instrumental in achieving natural sounding synthetic speech. The units selected by the unit assembly subsystem 34 are preferably fed into a speech synthesis subsystem 38 that generates a speech signal 24.

As indicated above, concatenative synthesis is characterized by storing, selecting, and smoothly concatenating prerecorded segments of speech. Until recently, the majority of concatenative TTS systems have been diphone-based. A diphone unit encompasses that portion of speech from one quasi-stationary speech sound to the next. For example, a diphone may encompass approximately the middle of the /ih/ to approximately the middle of the /n/ in the word "in".

An American English diphone-based concatenative synthesizer requires at least 1000 diphone units, which are typically obtained from recordings from a specified speaker. Diphone-based concatenative synthesis has the advantage of moderate memory requirements, since one diphone unit is used for all possible contexts. However, since speech databases recorded for the purpose of providing diphones for synthesis are not sound lively and natural sounding, since the speaker is asked to articulate a clear monotone, the resulting synthetic speech tends to sound unnatural.

Expert manual labelers have been used to examine waveforms and spectrograms, as well as to use sophisticated listening skills to produce annotations or labels, such as word labels (time markings for the end of words), tone labels (symbolic representations of the melody of the utterance), syllable and stress labels, phone labels, and break indices that distinguish between breaks between words, sub-phrases, and sentences. However, manual labeling has largely been eclipsed by automatic labeling for large databases of speech.

Automatic labeling tools can be categorized into automatic phonetic labeling tools that create the necessary phone labels, and automatic prosodic labeling tools that create the necessary tone and stress labels, as well as break indices. Automatic phonetic labeling is adequate if the text message is known so that the recognizer merely needs to choose the proper phone boundaries and not the phone identities. The speech recognizer also needs to be trained with respect to the given voice. Automatic prosodic labeling tools work from a set of linguistically motivated acoustic features, such as normalized durations and maximum/average pitch ratios, and are provide with the output from phonetic labeling.

Due to the emergence of high-quality automatic speech labeling tools, unit-selection synthesis, which utilizes speech databases recorded using a lively, more natural speaking style, have become viable. This type of database may be restricted to narrow applications, such as travel reservations or telephone number synthesis, or it may be used for general applications, such as e-mail or news reports. In contrast to diphone-based concatenative synthesizers, unit-selection synthesis automatically chooses the optimal synthesis units from an inventory that can contain thousands of examples of a specific diphone, and concatenates these units to generate synthetic speech.

Figure 4:
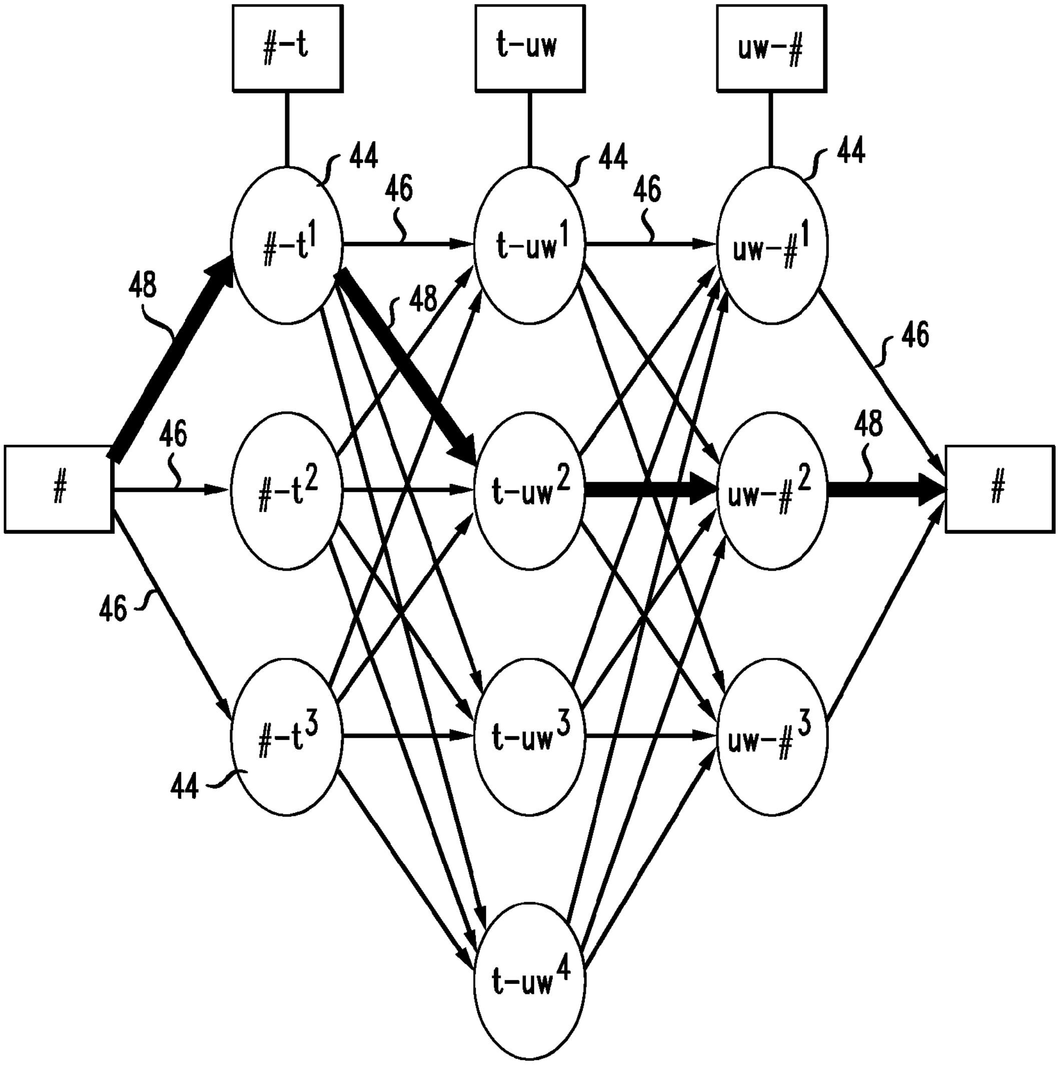
FIG. 4 PRIOR ART
FIG. 4 is diagram showing the operation of a unit selection process.

The unit selection process is shown in FIG. 4 as trying to select the best path through a unit-selection network corresponding to sounds in the word "two". Each node 44 is assigned a target cost and each arrow 46 is assigned a join cost. The unit selection process seeks to find an optimal path, which is shown by bold arrows 48 that minimize the sum of all target costs and join costs. The optimal choice of a unit depends on factors, such as spectral similarity at unit boundaries, components of the join cost between two units, and matching prosodic targets or components of the target cost of each unit.

Unit selection synthesis represents an improvement in speech synthesis since it enables longer fragments of speech, such as entire words and sentences to be used in the synthesis if they are found in the inventory with the desired properties. Accordingly, unit-selection is well suited for limited-domain applications, such as synthesizing telephone numbers to be embedded within a fixed carrier sentence. In open-domain applications, such as email reading, unit selection can reduce the number of unit-to-unit transitions per sentence synthesized, and thus increase the quality of the synthetic output. In addition, unit selection permits multiple instantiations of a unit in the inventory that, when taken from different linguistic and prosodic contexts, reduces the need for prosody modifications.

Figure 5:
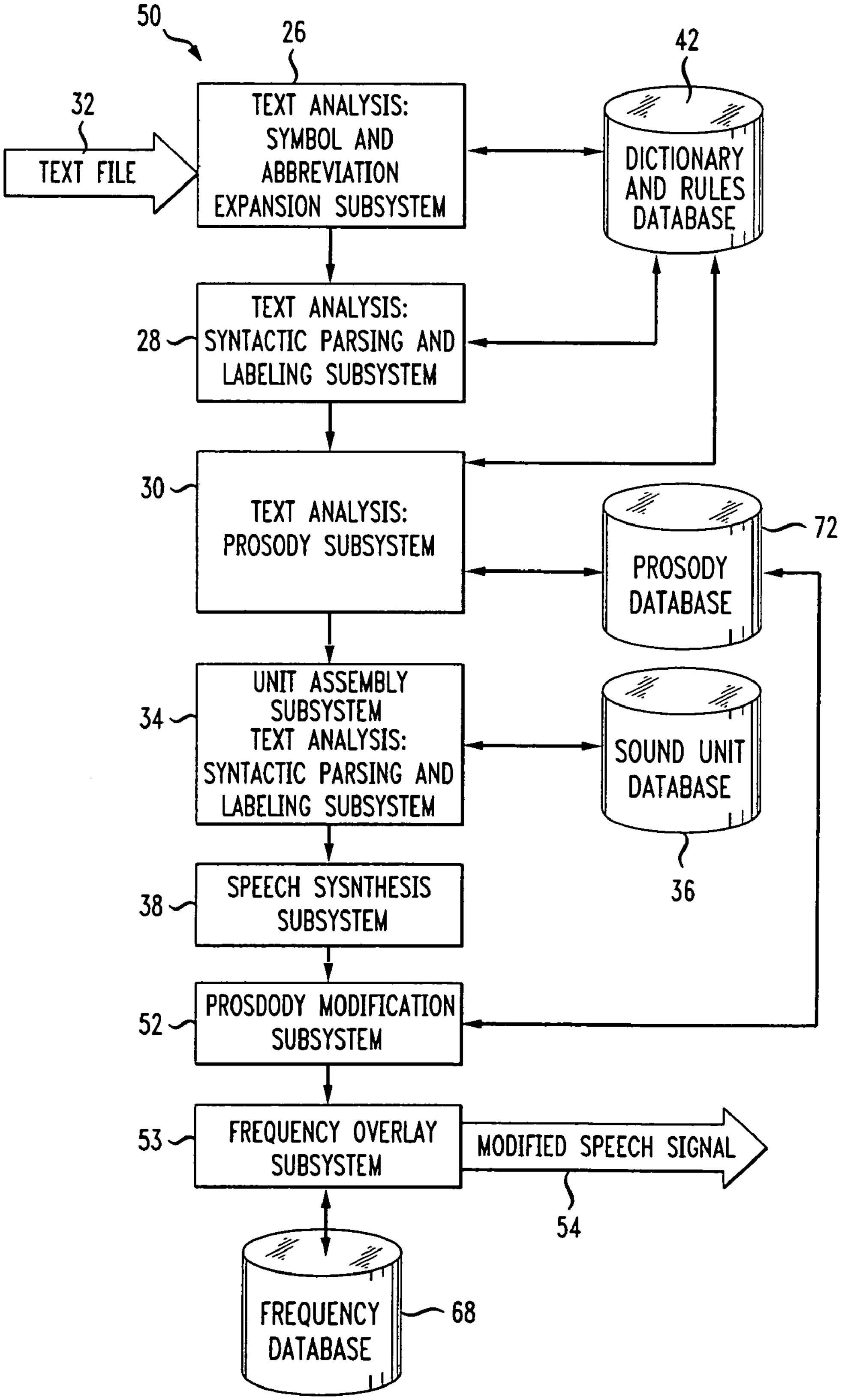
FIG. 5 is a block diagram of a TTS subsystem formed in accordance with the present invention.

FIG. 5 shows the TTS subsystem 50 formed in accordance with the present invention. The TTS subsystem 50 is substantially similar to that shown in FIG. 3, except that the output of the speech synthesis subsystem 38 is preferably modified by a prosody modification subsystem 52 prior to outputting a modified speech signal 54. In addition, the TTS subsystem 50 also preferably includes a frequency overlay subsystem 53 subsequent to the prosody modification subsystem 52 to modify the prosody prior to outputting the modified speech signal 54. Overlaying a frequency on the prosody modified speech signal prior to outputting the modified speech signal 54 ensures that the modified speech signal 54 will not be understood by an IVR system utilizing automated speech recognition techniques while at the same time not significantly degrading the quality of the speech signal with respect to human understanding.

Figure 6:
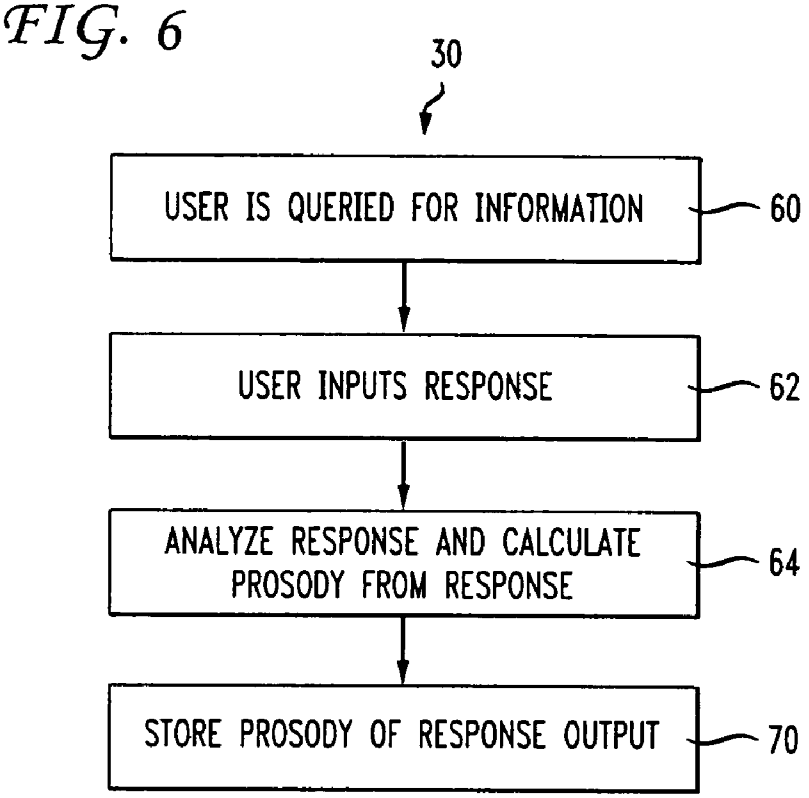
FIG. 6 is a flow chart of a method for obtaining prosody of a user's voice.

FIG. 6 is a flow chart showing a method for obtaining the prosody of the user's speech pattern, which is preferably performed in the prosody subsystem 30 shown in FIG. 5. The calculation of the user's prosody may alternately take place before the text file 32 is retrieved. The user is first prompted for identifying information, such as a name in step 60. The user must then respond to the prompt in step 62. The user's response is then analyzed and the prosody of the speech pattern is calculated from the response in step 64. The output from the calculation of the prosody is then stored in step 70 in a prosody database 72 shown in FIG. 5. The calculation of the prosody of the user's voice signal will later be used by the prosody modification subsystem 52.

Figure 7:
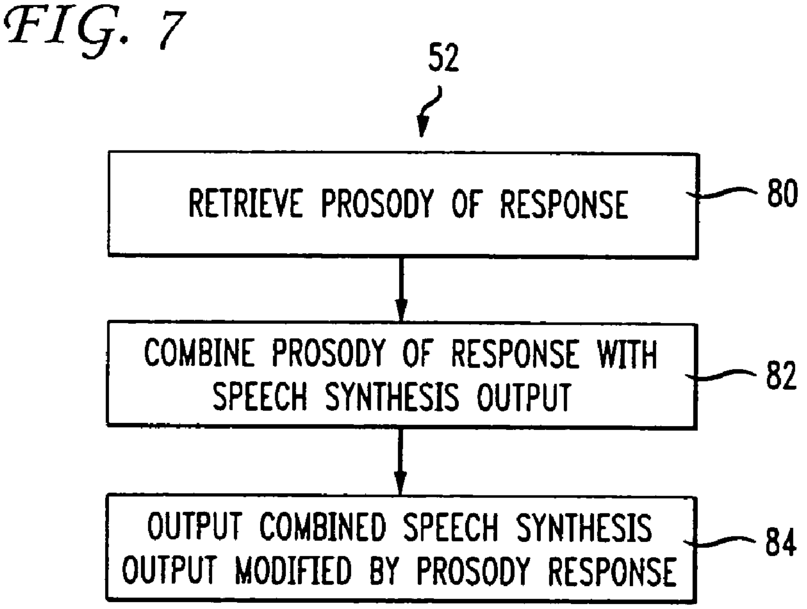
FIG. 7 is a flow chart of the operation of a prosody modification subsystem.

A flowchart of the operation of the prosody modification subsystem 52 is shown in FIG. 7. The prosody modification subsystem 52 first retrieves the prosody of the user output in step 80 from the prosody database 72, which was calculated earlier. The prosody of the user's response is preferably a combination of the pitch and tone of the user's voice, which is subsequently used to modify the speech synthesis subsystem output. The pitch and tone values from the user's response can be used as the pitch and tone for the speech synthesis subsystem output.

For instance as shown in FIG. 5, the text file 32 is analyzed by the text analysis symbol and abbreviation expansion subsystem 26. The dictionary and rules database 42 is used to generate the grapheme to phoneme transcription and "normalize" acronyms and abbreviations. The text analysis prosody subsystem 30 then generates the target for the "melody" of the spoken sentence. The unit assembly subsystem text analysis syntactic parsing and labeling subsystems 34 then uses the sound unit database 36 by using advanced network optimization techniques that evaluate candidate units in the text that appear during recording and synthesis. The sound unit database 36 are snippets of recordings, such as half-phonemes. The goal is to maximize the similarity of the recording and synthesis contacts so that the resultant quality of the synthetic speech is high. The speech synthesis subsystem 38 converts the stored speech units and concatenates these units in sequence with smoothing at the boundaries. If the user wants to change voices, a new store of sound units is preferably swapped in the sound unit database 36.

Thus, the prosody of the user's response is combined with the speech synthesis subsystem output in step 82. The prosody of the user's response is then used by the speech synthesis subsystem 38 after the appropriate letter-to-sound transitions are calculated. The speech synthesis subsystem can be a known program such as AT&T Natural Voices™ text-to-speech. The combined speech synthesis modified by the prosody response is output by the prosody modification subsystem 52 (FIG. 5) in step 84 to create a prosody modified speech signal. An advantage of the prosody modification subsystem 52 formed in accordance with the present invention is that the output from the speech synthesis subsystem 38 is modified by the user's own voice prosody and the modified speech signal 54, which is output from the subsystem 50, preferably changes with each user. Accordingly, this feature makes it very difficult for an IVR system to recognize the TTS output.

Figure 8A:
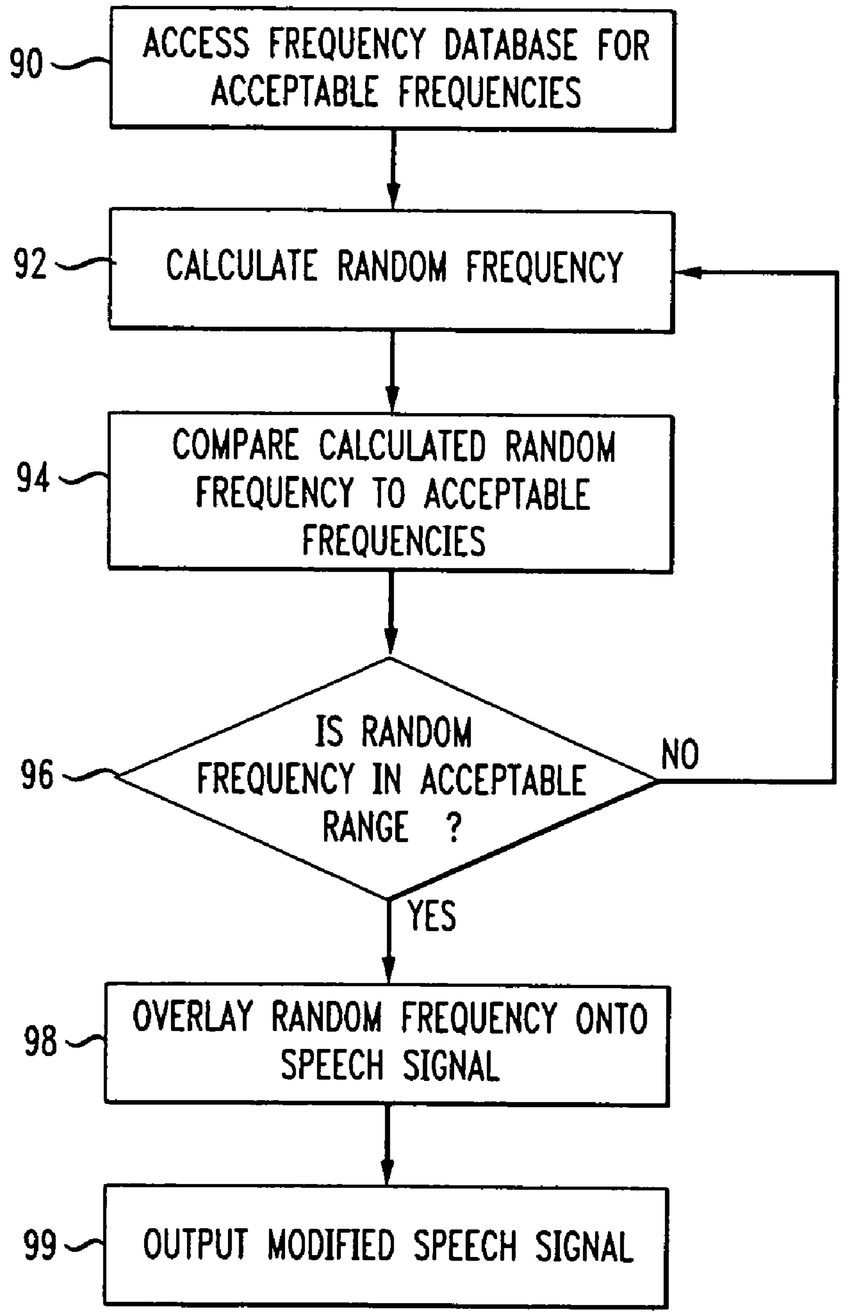
FIG. 8A is a flow chart of the operation of a frequency overlay subsystem.

A flow chart showing one embodiment of the operation of the frequency overlay subsystem 53, which is shown in FIG. 5, is shown in FIG. 8A. The frequency overlay subsystem 53 preferably first accesses a frequency database 68 for acceptable frequencies in step 90. The acceptable frequencies are preferably within the human hearing range (20-20,000 Hz), either at the upper or lower end of the audible range such as 20-8,000 Hz and 16,000-20,000 Hz, respectively. A random frequency signal is then calculated in step 92. The random frequency signal is preferably calculated using a random number generation algorithm well known in the art. The randomly calculated frequency is then preferably compared to the acceptable frequency range in step 94. If the random frequency signal is not within the acceptable range in step 96, the system then recalculates the random frequency signal in step 92. This cycle is repeated until the randomly calculated frequency is within the acceptable frequency range. If the random frequency signal is within the acceptable frequency range, the random frequency signal 92 is overlayed onto the prosody modified subsystem speech signal in step 98. The random frequency signal 92 can be overlayed onto the prosody modified subsystem speech signal by combining or mixing the signals to create the output modified speech signal. The random frequency signal and the prosody modified subsystem speech signal can be output at the same time to create the output modified speech signal. The random frequency signal will be heard by the user, however, it will not make the prosody modified subsystem speech signal unintelligible. An output modified speech signal is then output in step 99.

Figure 8B:
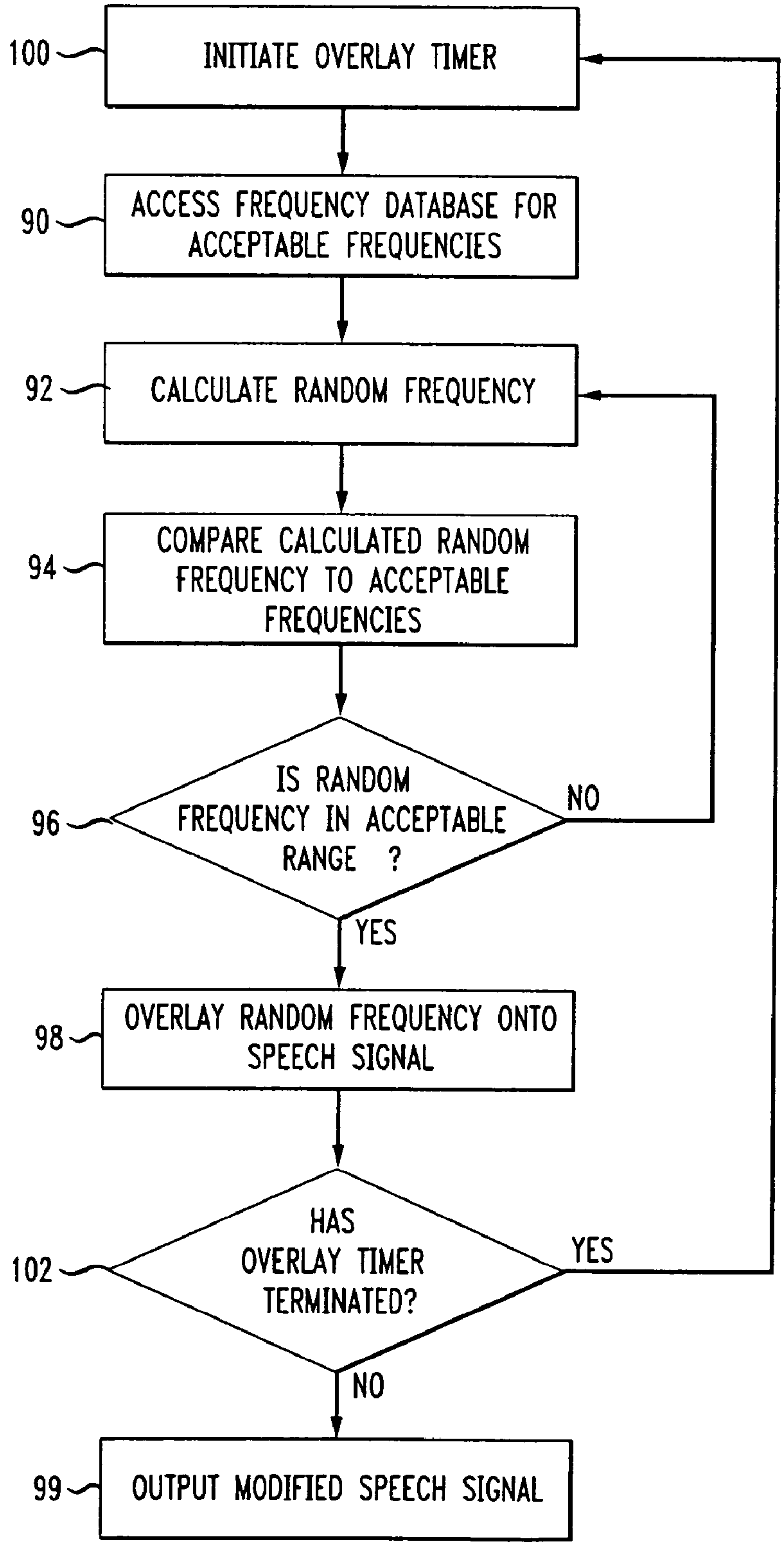
FIG. 8B is a flow chart of the operation of an alternative embodiment of the frequency overlay subsystem including an overlay timer.

In an alternative embodiment shown in FIG. 8B, the random frequency signal generated is preferably changed during the course of outputting the modified speech signal in step 99. Referring to FIG. 8B, before the random frequency signal overlay subsystem is activated, the system will preferably initialize an overlay timer in step 100. The overlay timer 100 is preset such that after a predetermined time the timer will then reset. After the overlay timer is set, the functions of the frequency overlay subsystem shown in FIG. 8A are preferably carried out. The output modified speech signal 54 is then outputted in step 99. While the output modified speech signal 54 is outputted, the overlay timer is accessed in step 102 to see if the timer has expired. If the timer has expired, the system will then reinitialize the overlay timer in step 100, and reiterate steps 90, 92, 94, 96 and 98 to overlay a different random frequency signal. If the overlay timer has not expired, the output modified speech signal 54 preferably continues with the same random frequency signal 92 being overlayed. An advantage of this system is that the random frequency signal will periodically be changed, thus making it very difficult for an IVR system to recognize the modified speech signal 54.

Figure 9A:
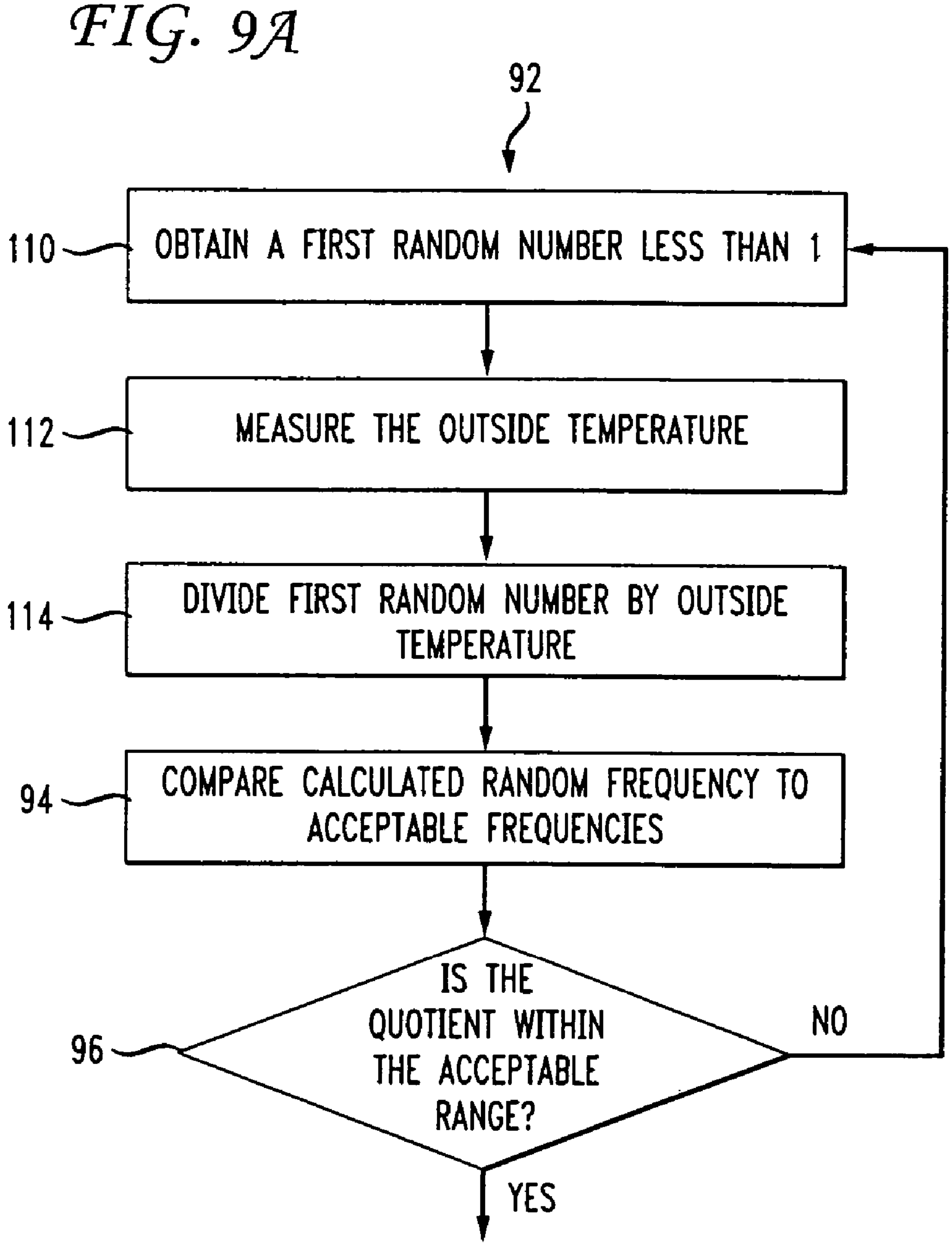
FIG. 9A is a flow chart of a method from obtaining a random frequency signal.

Referring to FIG. 9A, the random frequency signal that is calculated in step 92 in FIGS. 8A and 8B is preferably calculated by first obtaining a first random number that is below the value 1.0 in step 110. A second random number 112, such as an outside temperature is then measured in step 112. The system then preferably divides the first random number by the second random number in step 114. This quotient is compared to acceptable frequencies in step 94 and if it is within the acceptable range in step 96, then the random number is used as an overlay frequency. However, if the quotient is not within an acceptable range in step 96, the system then obtains a new first random number that is below the value of 1.0 and repeats steps 110, 112, 94 and 96. The value of the number under 1.0 is preferably obtained by a random number generation algorithm well known in the art. The number of decimal places in this number is preferably determined by the operator.

Figure 9B:
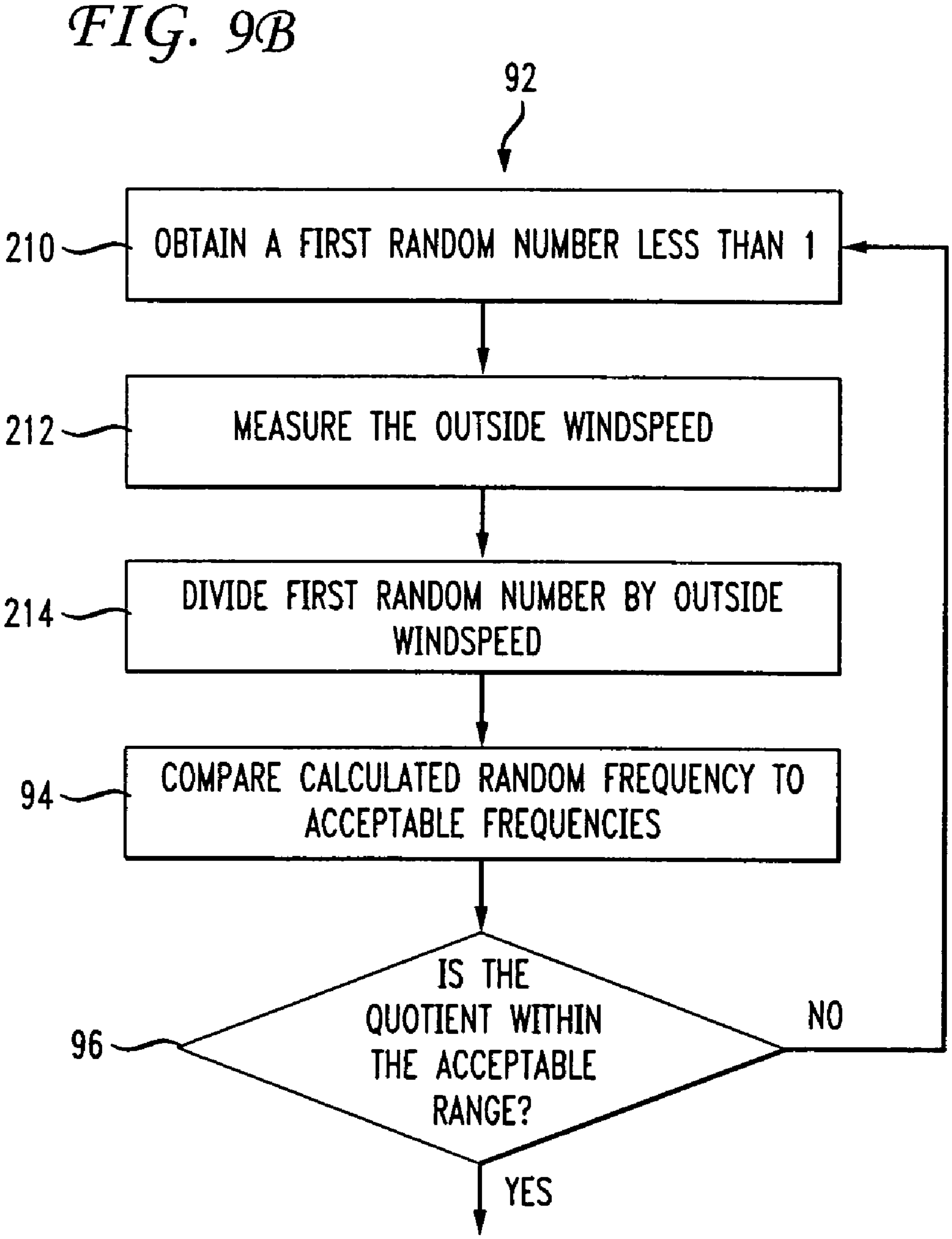
FIG. 9B is a flow chart of a second embodiment of the method for obtaining a random frequency signal.

In an alternative embodiment shown in FIG. 9B, instead of measuring the outside temperature in step 112, the outside wind speed can be measured in step 212 and also be used to generate the second random number. It is anticipated that other variables may alternately be used while remaining within the scope of the present invention. The remainder of the steps are substantially similar to those shown in FIG. 9A. The important nature of the outside temperature or the outside wind speed is that they are random and not predetermined, thus making it more difficult for an IVR system to calculate the frequency corresponding to the modified speech signal.

Figure 9C:
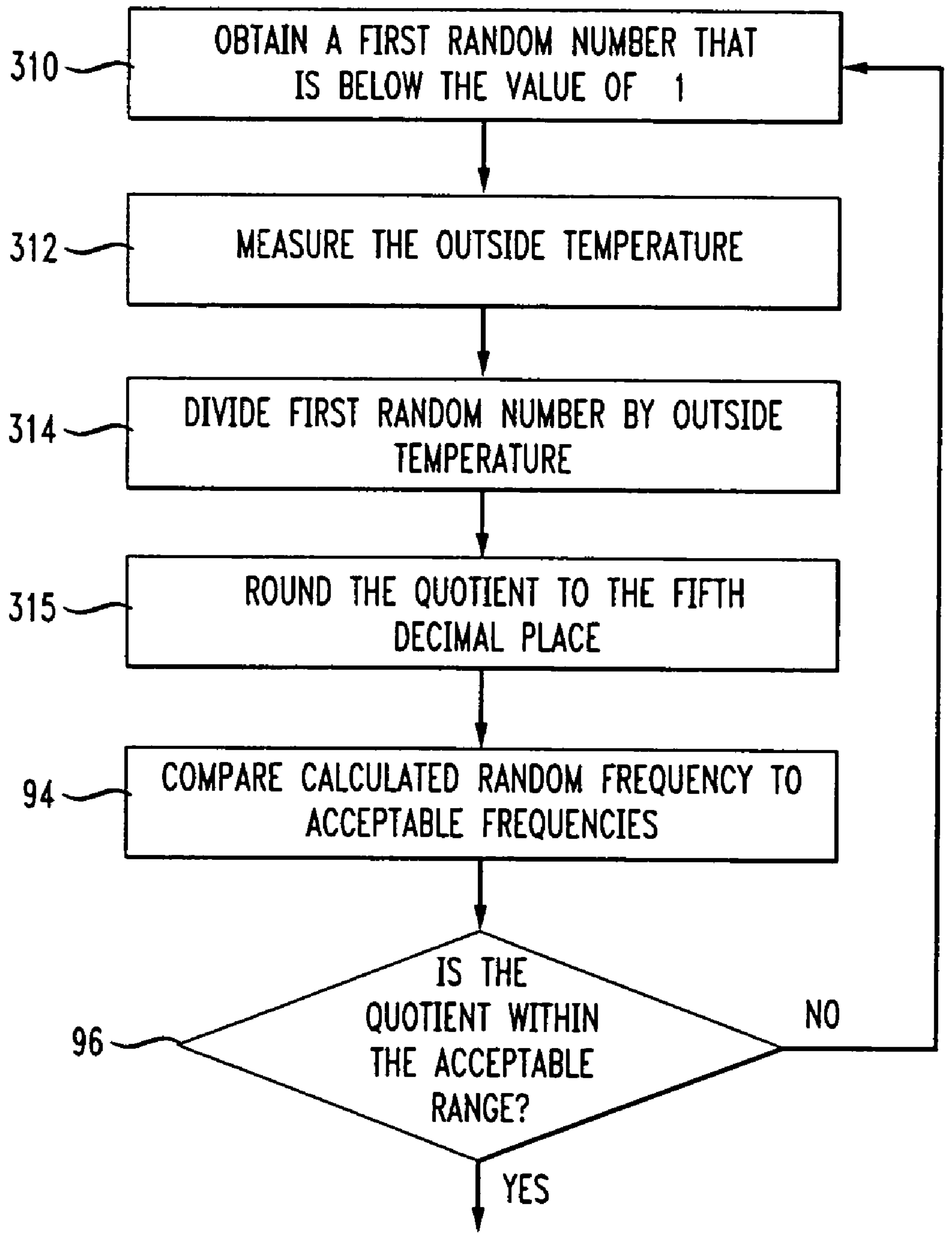
FIG. 9C is a flow chart of a third embodiment of the method for obtaining a random frequency signal.

In an alternative embodiment shown in FIG. 9C, after the first random number is obtained in step 310 and divided by an outside temperature in step 314, the quotient is preferably less than 1.0. The number is preferably rounded to the nearest digit in the 5th decimal place in step 315. It is anticipated that any of the parameters used to obtain the random frequency signal may be varied while remaining within the scope of the present invention.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of generating a speech signal comprising the steps of:

prompting a user for a response;

obtaining a prosody sample from the response;

modifying at least one prosody characteristic of a speech signal based on the prosody sample to create a prosody modified speech signal;

(a1) obtaining an acceptable frequency range;

(a2) calculating a random frequency signal, the random frequency signal calculation comprising (b1) obtaining a first random number, (b2) measuring a variable parameter, (b3) equating a second random number to the variable parameter, (b4) dividing the first random number by the second random number to generate a quotient, wherein if the quotient is not within the acceptable frequency range then repeating steps (b1)-(b4), otherwise using the quotient as the random frequency signal;

(a3) comparing the random frequency signal to the acceptable frequency range, wherein if the random frequency signal is not within the acceptable frequency range, then repeating steps (a1)-(a3), otherwise;

(a4) overlaying the random frequency signal onto the prosody modified speech signal;

(a5) initializing an overlay timer, the overlay timer being adapted to expire at a predetermined time;

(a6) determining if the overlay timer has expired, wherein if the overlay timer has expired then repeating steps (a2)-(a6), otherwise outputting a prosody modified speech signal thereby preventing comprehension of said prosody modified speech signal by a speech recognition system.

2. A method of generating a speech signal as defined in claim 1, wherein the second random number comprises a measured outside ambient temperature.

3. A method of generating a speech signal as defined in claim 1, wherein the second random number comprises the outside wind speed.

4. A method of generating a speech signal as defined in claim 3, wherein the random frequency signal is rounded to the fifth decimal place.

5. A method of generating a speech signal as defined in claim 1, wherein the acceptable frequency range is within the audible human hearing range.

6. A method of generating a speech signal as defined in claim 5, wherein the acceptable frequency range is between 20 Hz and 8,000 Hz.

7. A method of generating a speech signal as defined in claim 5, wherein the acceptable frequency range is between 16,000 Hz and 20,000 Hz.

8. A method of generating a speech signal for preventing the comprehension of the speech signal by a speech recognition system, the method comprising the steps of:

accessing a text file;

utilizing a text-to-speech synthesizer to generate a speech signal from the text file;

prompting a user for a response;

obtaining a prosody sample from the response;

obtaining an acceptable frequency range;

initializing an overlay timer, the overlay timer being adapted to expire at a predetermined time;

calculating a random frequency signal, the random frequency signal calculation comprising obtaining a first random number, measuring a variable parameter, equating a second random number to the variable parameter, dividing the first random number by the second random number to generate a quotient, wherein if the quotient is not within the acceptable frequency range then recalculating the random frequency signal, otherwise equating the random frequency signal to the quotient;

comparing the random frequency signal to the acceptable frequency range, wherein if the random frequency signal is not within the acceptable frequency range then recalculating the random frequency signal, otherwise determining if the overlay timer has expired, wherein if the overlay timer has expired then recalculating and comparing the random frequency signal, otherwise overlaying the random frequency signal onto the speech signal; and modifying the speech signal with the prosody sample.

9. A method of generating a speech signal as defined in claim 8, wherein the second random number comprises a measured outside ambient temperature.

10. A method of generating a speech signal as defined in claim 8, wherein the second random number comprises an outside wind speed.

11. A method of generating a speech signal as defined in claim 8, wherein the quotient is rounded to the fifth decimal place before being equated.

12. A method of generating a speech signal as defined in claim 8, wherein the acceptable frequency range is within an audible human hearing range.

13. A method of generating a speech signal as defined in claim 12, wherein the acceptable frequency range is between 20 Hz and 8,000 Hz.

14. A method of generating a speech signal as defined in claim 12, wherein the acceptable frequency range is between 16,000 Hz and 20,000 Hz.

* * * * *